United States Patent
Basso et al.

(10) Patent No.: US 10,015,291 B2
(45) Date of Patent: Jul. 3, 2018

(54) HOST NETWORK CONTROLLER

(71) Applicant: International Business Machines Corporation, Armonk, NY (US)

(72) Inventors: Claude Basso, Nice (FR); Philippe Damon, Chapel Hill, NC (US); Fabrice J. Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 14/856,677

(22) Filed: Sep. 17, 2015

(65) Prior Publication Data

US 2016/0134462 A1    May 12, 2016

(30) Foreign Application Priority Data

Nov. 7, 2014 (GB) .................................... 1419821.2

(51) Int. Cl.
*H04L 12/24* (2006.01)
*H04L 29/06* (2006.01)
*H04L 12/40* (2006.01)

(52) U.S. Cl.
CPC ........ *H04L 69/22* (2013.01); *H04L 12/40013* (2013.01); *H04L 41/0806* (2013.01)

(58) Field of Classification Search
CPC .................................................. H04L 41/0806
USPC .................................................. 709/223, 224
See application file for complete search history.

(56) References Cited

U.S. PATENT DOCUMENTS

| 5,574,919 A | 11/1996 | Netravali et al. |
| 5,963,447 A * | 10/1999 | Kohn ............... G05B 19/41865 |
| | | 700/181 |
| 7,706,409 B2 | 4/2010 | Basso et al. |
| 2005/0238012 A1 | 10/2005 | Panigrahy et al. |
| 2006/0069884 A1* | 3/2006 | Kim .................... H04L 12/2812 |
| | | 711/154 |
| 2012/0159132 A1 | 6/2012 | Abel et al. |
| 2012/0195208 A1 | 8/2012 | Abel et al. |
| 2012/0198213 A1 | 8/2012 | Abel et al. |

(Continued)

FOREIGN PATENT DOCUMENTS

WO     2012080170 A1     6/2012

OTHER PUBLICATIONS

Slaight, T., "Network Controller-Sideband Interface (NC-SI)", Management Developers Conference (MDC), Intel Corporation, Dec. 3-6, 2007, Santa Clara Marriott, Santa Clara, CA, Copyright DMTF 2007, pp. 1-19.

(Continued)

Primary Examiner — Adnan Mirza
(74) Attorney, Agent, or Firm — Jared L. Montanaro

(57) ABSTRACT

Provided is a method for operating a host network controller for a network processor where the host network controller has at least one register. A restricted set of state data may be stored in at least one register. The restricted set of state data may be indicative of fewer possible states than those defined in accordance with a standardized communication protocol. The host network controller may implement a finite state machine based on the restricted set of state data stored in the at least one register such that the finite state machine may have fewer possible states than those defined in accordance with the standardized communication protocol.

20 Claims, 8 Drawing Sheets

(56) References Cited

U.S. PATENT DOCUMENTS

2012/0221497 A1    8/2012   Goyal et al.
2016/0085722 A1*   3/2016   Verplanken ......... G06F 13/4282
                                                                                                     710/313

OTHER PUBLICATIONS

International Search Report dated May 19, 2015 for International Application No. GB1419821.2, 3 pages.
GB Application 1419821.2, entitled "Host Network Controller", filed Nov. 7, 2014, 39 pages.
List of IBM Patents or Patent Applications Treated as Related, dated Sep. 15, 2015, 2 pages.
Basso et al., "Host Network Controller", U.S. Appl. No. 14/856,651, filed Sep. 17, 2015, pp. 1-39.

* cited by examiner

HOST NETWORK CONTROLLER

BACKGROUND

The invention relates to the field of data networking. More particularly, the invention relates to a host network controller for a network processor.

Due to the increasing use of data intensive applications such as video streaming or Voice-over-IP via the internet, communication links (e.g., optic or copper cables) and data processing units which are operable to transmit and process a large number of data packets in a short amount of time are needed. Data packet processing supporting such data intensive applications requires significant computational power and the demand for processing power for managing Internet traffic is continuously growing. New types of specialized processors, so called "network processors," have been developed which are particularly suited for the handling and processing of data packets to be transmitted via a network, in particular the Internet.

Conventionally, network processors were either constructed as general-purpose processors (GPPs) or as application-specific integrated circuits (ASICs). While GPPs provide for high flexibility, they may not be specifically designed for the needs related to network processing and are therefore often too slow. To the contrary, ASICs are integrated circuits (ICs) designed for the particular needs of processing data packets to be transmitted over a network. ASICs can therefore solve their particular tasks very quickly and efficiently, but they are expensive and inflexible.

In network management environments, the interface between a management controller (MC) and a network controller (NC) of a network processor is very important. The Network Controller-Sideband Interface (NC-SI) specification has been created to define a standardized interface that enables a NC to provide network access for a MC, while allowing the NC to simultaneously and transparently provide network access for a host system. The NC-SI specification defines protocols and electrical specifications for a common Sideband Interface (SI) between a MC and an 802.3 Local Area Network (LAN) via one or more external NCs. The NC-SI specification version 1.0.0 was published in July 2009 by the PMCI Working Group of the Distributed Management Task Force (DMTF).

A network processor usually processes data packets by undertaking a parsing step. In doing so, a parser of the network processor extracts, manipulates, and analyzes the contents of packet headers and fields and passes parsed packets or parts thereof to other network processor components. Parsing performance is typically increased by increasing the clock frequency of the logic storing and/or executing a parsing instruction. Said approach requires a more powerful and expensive hardware and leads to an increased power dissipation, an unwelcome effect in financial and ecological terms.

SUMMARY

Embodiments of the present disclosure include a method, system, and computer program product for operating a host network controller. In an embodiment, this disclosure includes a method for operating a host network controller for a network processor where the host network controller has at least one register. A restricted set of state data may be stored in at least one register. The restricted set of state data may be indicative of fewer possible states than those defined in accordance with a standardized communication protocol. The host network controller may implement a finite state machine based on the restricted set of state data stored in the at least one register such that the finite state machine may have fewer possible states than those defined in accordance with the standardized communication protocol.

The above summary is not intended to describe each illustrated embodiment or every implementation of the present disclosure.

BRIEF DESCRIPTION OF THE DRAWINGS

Embodiments of the invention will now be described, by way of example only, with reference to the accompanying drawings in which.

DETAILED DESCRIPTION

Figure 1:
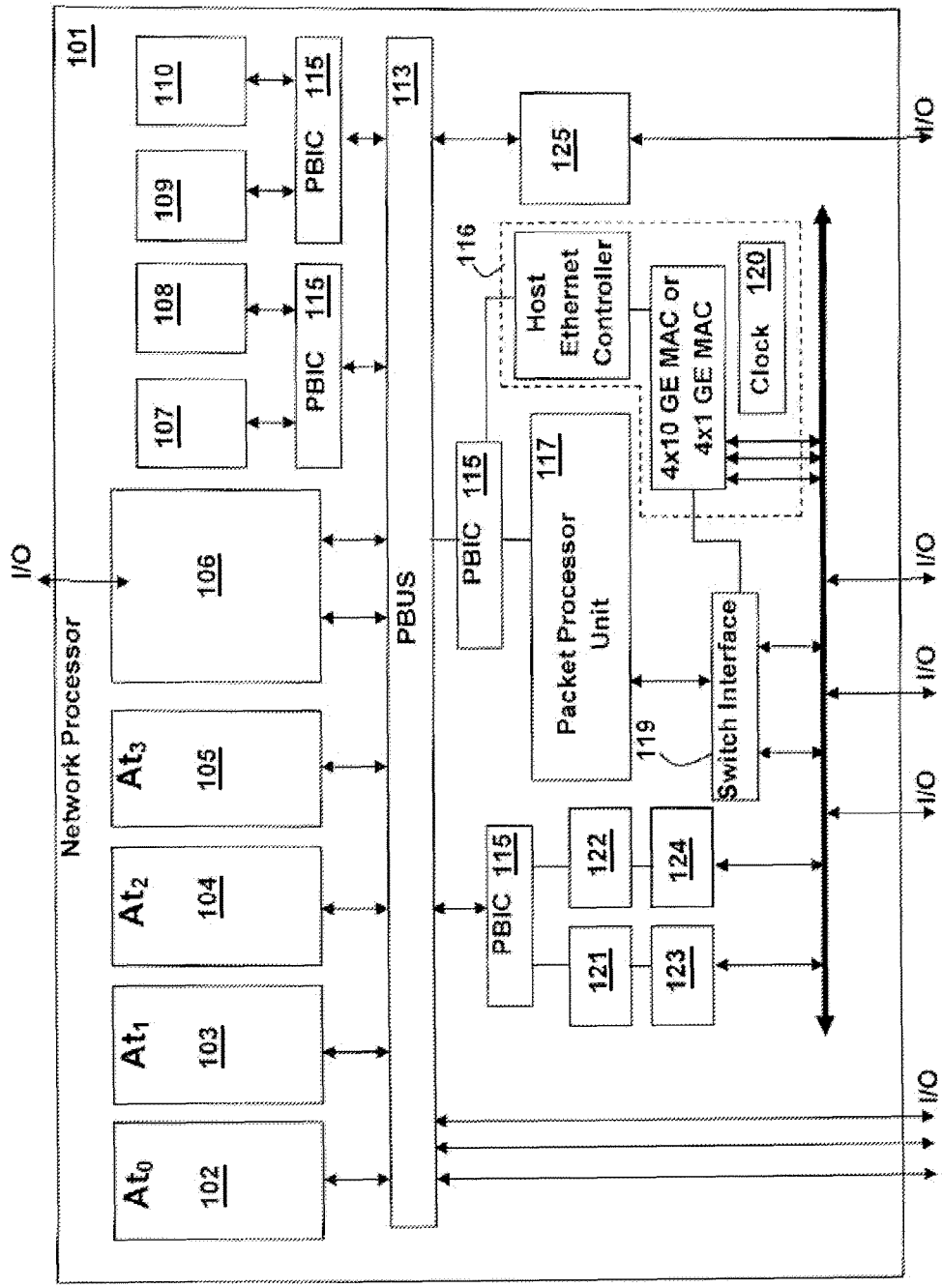
FIG. 1 depicts a high-level network processor architecture, in accordance with embodiments of the present disclosure.

According to an aspect of the invention, there is provided a host network controller for a network processor, the host network controller being adapted to implement a finite state machine for an operation adhering to a standardized communication protocol, wherein the host network controller comprises:

at least one register adapted to store a restricted set of state data indicative of fewer possible states than those defined for the operation in accordance with the standardized communication protocol;

and wherein the host network controller is further adapted to implement the finite state machine based on the restricted set of state data stored in the at least one register such that finite state machine has fewer possible states than those defined for the operation in accordance with the standardized communication protocol.

Thus, by way of example, embodiments may be employed in the implementation of a standardized interface using reduced logic area and power dissipation. Unlike conventional approaches, which rely on the use of an embedded microcontroller, embodiments may use a programmable architecture which provides for improved flexibility and reduced area and/or power consumption.

Embodiments may implement a state machine which makes operating and/or processing decisions depending on data read from one or more registers of a host Ethernet adapter (HEA) of a network processor.

Thus, an embodiment may comprise a parser for a network processor, wherein the parser employs a finite state machine (FSM) that only implements a reduced set of states compared to those defined in a standard communication protocol or standard. By way of example, the standardized communication protocol may comprise the NC-SI specification, and operation may comprise package-specific operation, or channel-specific operation. Further, where the NC-SI specification describes eight (8) states related to a package operation, an embodiment may employ a state machine that only implements four (4) of the eight states. Similarly, where the NC-SI specification describes five (5) states related to a channel operation, an embodiment may employ a state machine that only implements four (4) of the five states.

The proposed parser may also be augmented or supplemented by the provision of one or more Action Machines (AMs). Such AMs may be hardware accelerators which are specifically designed/adapted to undertake certain functions or processes. By way of example, embodiments may comprise AMs that implement specific functions of a standardized communication protocol or standard (such as a communication protocol adhering to the NC-SI specification for example).

The AMs may be adapted to implement the State Machine so that it can send/receive data via a predefined communication interface (such as an Action Machine Filler (AMF)) of a network processor. Such embodiments may therefore be employed in a network processor having a communication interface (such as an AMF) for sending/receiving data to/from AMs. Thus, an AM employed in an embodiment may be able to manipulate bytes extracted from NC-SI commands sent by a management controller (MC) (and/or from NC logic) in order to use them in a command parsing process and/or a NC-SI operation. Byte manipulation may include additions, comparisons, realignments, bit maskings, concatenations, etc.

In an embodiment, an AM may be adapted to implement a NC-SI Operational State Machine (OSM). Such an AM may enable a ruleset to simultaneously control hardware interfaces and state transitions.

In an embodiment, an AM may be adapted to implement the Instance ID (IID) parameter of the NC-SI specification in a simplified way as seen from the ruleset.

In an embodiment, an AM may be adapted to implement Channel Filters (CHF) for Receiving (Rx) and Transmitting (Tx) directions in a way that simplifies the design of the ruleset executing NC-SI commands which configure the filters.

Embodiments may be employed in a host Ethernet adapter (HEA) of a network processor. Thus, according to an aspect of the invention, there may be provided a HEA for the network processor, wherein the HEA comprises a parser according to an embodiment. Such a HEA may further comprise one or more AMs that implement specific functions of a standardized communication protocol or standard.

Embodiments may thus be employed in a network processor. Such embodiments may provide for improved performance, particular in terms of flexibility, area requirements, and/or power consumption.

According to another aspect of the invention, there is provided a method of operating a host network controller for a network processor, wherein the host network controller comprises a least one register, and wherein the method comprises:

storing in the at least one register a restricted set of state data indicative of fewer possible states than those defined for an operation in accordance with a standardized communication protocol, causing the host network controller to implement a finite state machine for the operation adhering to a standardized communication protocol based on the restricted set of state data stored in the at least one register such that finite state machine has fewer possible states than those defined for the operation in accordance with the standardized communication protocol.

According to yet another aspect of the invention, there is provided a computer program product for operating a host network controller, wherein the computer program product comprises a computer-readable storage medium having computer-readable program code embodied therewith, the computer-readable program code configured to perform all of the steps of a method according to an embodiment.

In an embodiment, a computer system may be provided which comprises: a computer program product according to an embodiment; and one or more processors adapted to perform a method according to an embodiment by execution of the computer-readable program code of said computer program product.

Embodiments may be flexibly adaptable to a multitude of different data packet protocols and formats and to a multitude of different network processor hardware architectures.

Embodiments may be highly flexible and fast at the same time by complementing hardware-level performance by a parser being operable to execute flexibly adaptable computer interpretable instructions in the form of software, i.e., in the form of instructions written in a programming language.

A "network processor" as referred to herein may be an integrated circuit which has a feature set specifically targeted at the networking application domain. Network processors usually consist of multiple, connected processing and memory units. Network processors are components of many different types of network equipment such as routers, switches, firewalls, session border controllers and the like.

A "rule" as referred to herein may be a set of computer interpretable instructions specifying how one or more data packets are to be processed. A rule according to embodiments may be a computer-interpretable statement with at least two logical parts: an if-clause and a then-clause, whereby the then-clause is only executed in case the if-clause returns the Boolean value "true".

A "rules repository" as referred to herein is any volatile or non-volatile computer-readable data storage medium having stored a plurality of rules.

The term "action machines" as referred to herein refers to hardware accelerators which are part of a network processor. Action machines process selected parts of data packets and support functions such as packet parsing and classification, high-speed pattern search, checksum calculation, and others.

The term "picoprocessor" as referred to herein refers to a scaled down RISC processor. A picoprocessor according to some embodiments comprises sixteen 32-bit or thirty-two 16-bit general purpose registers per thread and a one-cycle arithmetic-logical unit (ALU) supporting an instruction set that includes, e.g., binary addition and subtraction, bit-wise logical AND, OR and NOT operations, compare operation, a counting function, a logical or arithmetic shift left and right, bit-manipulation commands, and others.

A "packet pointer" as referred to herein is a memory address pointing to a particular bit or byte of a packet.

The term "working cycle" as referred to herein refers to a logical unit of work. Depending on the embodiment and in particular on the hardware infrastructure of the network processor used in said embodiments, each working cycle may correspond to exactly one clock cycle or to n clock cycles wherein n is an integer larger than 1.

The expression "loaded data" as used herein refers to any data, including computer-interpretable instructions, which is available for a processor without any additional clock cycle for loading said data. "Loaded data" can be stored, e.g., in one or more registers of said processor or can be part of the inbuilt instruction set of said processor.

A parser, according to embodiments, comprises a set of one or more programmable picoprocessors which are operable to execute one or more rules having been loaded from the rules repository. Said rules comprise computer-interpretable instructions for parsing data packets. "Parsing" as used herein is the process of determining the structure of a data packet and processing its content. A parser may be "programmable," as the rules can be easily adapted to any change in the processed data packet type or according to new requirements regarding the processing workflow. A parser comprising the picoprocessors executing the rules can be described as a finite state machine. According to some embodiments, the picoprocessors of a parser may further comprise a set of instructions which are an integral part of the picoprocessors and are immediately available for execution by the picoprocessors without any additional loading step.

According to further embodiments, a data packet may comprise an envelope (or header) section and a payload section. Rules may be loaded and used by a parser to analyze the data packet. As a result of executing said rules on the data packet, which is one example for executing an analysis step to return a parsing decision, data may be provided to an action machine according to an embodiment. Said data may be used to assemble a response packet having an envelope section and payload section containing information (e.g., field values) in data packet.

A "parsing decision," as used herein, is a processing operation executed by the parser by evaluating on one or more bytes of a data packet in order to determine how the data packet is to be processed and/or responded to. Typically, said parsing decision involves complex operations and may be demanding in terms of computational power.

In a further aspect the disclosure relates to a computer-readable non-transitory storage medium comprising instructions which, when executed by a processing device, execute the steps of the method of operating a network processor according to an embodiment.

Figure 2:
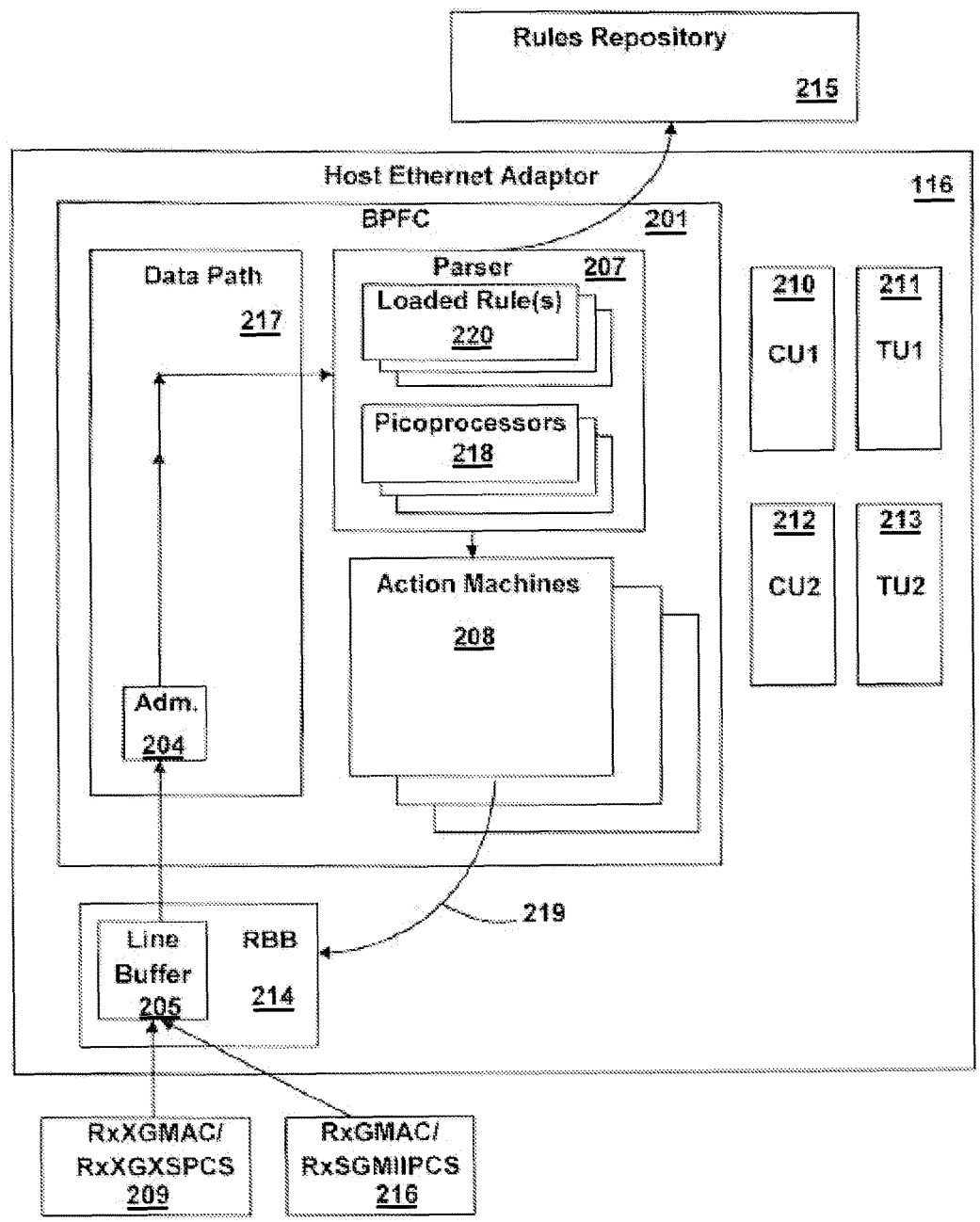
FIG. 2 depicts a host Ethernet adapter being part of the network processor in greater detail, in accordance with embodiments of the present disclosure.

Illustrative embodiments may be utilized in many different types of data processing environments and/or networks. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented.

FIG. 1 depicts a network processor 101 of the "Prism" architecture type. Said network processor comprises a multitude of components for receiving, buffering, processing, and forwarding data packets. Some core components can be identified on a high-level perspective.

Processors 102-105 are, according to some embodiments, general purpose processors. Each processor may comprise an L2 cache and may be implemented as a combination of a micro-engine performing bit wise serial processing and a RISC processor performing packet/cell queuing. The channel processors can be grouped into a cluster of, e.g., four channel processors to provide combined processing for high rate interfaces such as gigabit Ethernet.

The memory access unit 106 is in charge of performing I/O operations on the system memory. Said system memory is the main memory of the device comprising the network processor. Said device could be, for example, a router or a switch.

Several network processor modules 107-110 may execute additional functions, e.g., security functions such as encryption, authentication, firewalling, intrusion detection, pattern matching, compression, decompression, and others.

A Host Ethernet Adapter (HEA) 116 is a physical Ethernet adapter for the processors 102-105 of the network processor 101. HEAs offer high throughput, low latency, and virtualization support for Ethernet connections. HEAs are also known as Integrated Virtual Ethernet adapters (IVE adapters). According to embodiments, the HEA supports a network traffic speed of, e.g., 4×10 GB/s. A core function of the HEA can be seen as a module providing hardware acceleration for network processing tasks. The HEA comprises a host Ethernet controller, a clock 120, and a media access control unit (MAC unit). A MAC address is a unique identifier assigned to network interfaces for communication on the physical network segment. MAC addresses are most often assigned by the manufacturer of a network interface card and are stored, e.g., in its hardware, the card's read-only memory, or some other firmware mechanism.

PBIC 115 units are interfaces between the bus 113 and other components of the network processor.

The bus 113 interconnects the elements of the network processor.

The Packet Processor Unit 117 comprises several modules for Quality of Service (QoS) functions and data packet scheduling. It comprises a DMA module for direct system memory access. The Packet Processor Unit 117 executes data packet processing of data packets to be transported by the switch interface 119. The switch interface 119 acts as interface of the packet processor unit 117, the HEA, and several I/O channels indicated at the bottom of FIG. 1.

Additional modules 121-125 may be used for various I/O related functions.

FIG. 2 depicts the host Ethernet adapter 116 which comprises a multitude of modules for receiving, processing, and transmitting data packets in greater detail. Only a small subset of components and modules of the HEA is depicted in FIG. 2. Modules for processing data packets 210, 212 and modules 211, 213 for transmitting said data packets can be based—depending on the implementation of the HEA—on a multitude of different hardware and/or software components such as memories, ICs, software modules, and the like. Data packets are received from a media interface such as a 10 Gigabit Ethernet media access controller RxXGMAC/RxXGXSPCS (component 209), a Gigabit Ethernet media access controller RxGMAC/RxSGMIIPCS (component 216), or a reduced media independent interface (RMII). Said components 209, 216 are hardware components providing for low level hardware operations comprising, e.g., receiving data packets, classifying the received packets, and forwarding said data packets to the RBB unit 214. The RBB is operable to execute complex, high-level operations on the data packets which may require a considerable amount of processing time. As the number of data packets received by the RBB from the modules 209, 216 per time unit may exceed the amount of data packets the RBB unit is operable to process, the received data packets are stored in the line buffer 205. A line buffer 205 is a data structure that holds a fixed amount of data in a sequential order, e.g., according to the order the data packets are received by the line buffer. The line buffer 205 together with the RBB unit 214 constitutes a temporary data packet buffer helping to level out differences in the speed of receiving and processing data packages by the RBB unit. The terms "low-level" and "high-level" as used herein indicate that "high-level" operations are typically, but not necessarily, of complex structure, computational demanding and implemented by a software module while "low-level" operations are typically, but not necessarily, of a more simple nature and are typically implemented by hardware modules, e.g., ASICs.

After having been processed by the RBB unit, the data packets are forwarded from the RBB unit to the BPFC module 201. The BPFC module ("BFSM Parser Filter Checksum") is a module that receives data packets from the RBB unit, processes the received data packets, and returns them to the RBB unit (arrow 219). One of the main functions executed by the BPFC unit 201 is to determine which of a plurality of packet queues shall actually receive a particular processed data packet and to check whether said determined packet queue is available and ready to receive a packet. A list of available queues may be stored in a QPN table. The BPFC unit, or components thereof, further are responsible for tracking the packages and bytes received and processed, for classifying received packets, for checksum calculation, and for other tasks. The BPFC module 201 comprises three main physical and/or functional units: a data path unit 217, a parser 207 and a set of action machines 208.

The term "unit" or "module" are used herein synonymously and refer to functional units of a software or hardware component of the network processor. Depending on the embodiment, a "unit" may correspond to a physical unit, e.g., a particular hardware component or a program module, but it may likewise be the case that multiple functional units for one monolithic hardware block or software module or that functions of one functional unit are distributed among several different hardware or software modules.

The main function of the data path unit 217 is to expose data packets received from the RBB unit to the parser 207. The admission unit 204, which is a component of the data path unit 217, controls which data packet received from the RBB unit 214 is allowed to enter the data path and at what speed. The data path unit 217 ensures that the speed of the data packets entering the data path is in line with the data packet processing speed of the parser 207.

The main function of the parser 207 is to process (e.g., to analyze, inspect and manage) data packets received from the data path unit 217. The parser 207 decodes one or more fields of the packets in order to determine the packet format (e.g., the protocol used for storing and transmitting the data contained in a data packet). According to preferred embodiments, the parser 207 is implemented as a software module and executed by one or more picoprocessors 218. The main objective of a parser 207 according to embodiments of the invention is to analyze the packet and feed other network processor components, in particular packet queues and action machines 208, with the data packets, whereby the feeding depends on the result of said data packet analysis. The parser 207 is operable to read one or more rules stored in rules repository 215, load said rules into one or more registers of the processor executing the instructions of the parser and to execute the loaded one or more rules on the data packet. According to the depicted embodiment, said one or more registers may be the registers of the picoprocessors 218.

According to embodiments of the invention, a parser 207 can be considered as a finite state machine and the rules 220 used by the parser to analyze data packets can be considered as instructions determining when and how a state transition of said finite state machine occurs. The Rules 220, when executed by the parser, describe and determine how the parser progresses through a set of different states. The rules 220, according to embodiments of the invention, allow the software-based parser 207 to be run more efficiently on the picoprocessors 218.

The third major component of the BPFC unit is a set of Action Machines (AMs) 208. The AMs are hardware components, e.g., logic blocks being part of the network processor chip. According to some embodiments, said logic blocks may be implemented as ASICs. The AMs are in charge of specific networking tasks such as providing for a MAC-filter or for VLAN filters, for calculating an IP/TCP checksum, for implementing an NC-SI Operational State Machine (OSM), and for implementing Channel Filters (CHF), for example.

Proposed is the use of a parser in conjunction with a set of AMs to implement functions of a NC-SI interface. The parser employs a finite state machine (FSM) that only implements a reduced set of states compared to those defined in a standard communication protocol or standard. For example, where the NC-SI specification describes eight (8) states related to a package operation, the parser FSM may only implement four (4) of the eight states.

The proposed parser is augmented/supplemented by AMs which implement specific functions of the NC-SI specification, for example. Here, the AMs are adapted to send/receive data via a conventional communication interface (known as an Action Machine Filler (AMF)) which enables the reading/writing of data between the parser and the AMs.

Accordingly, in some embodiments, the proposed parser may be implemented separately from the BPFC 201. Such a parser may be smaller and simpler than the BPFC parser 207 that is used for regular network traffic. Also, it may be smaller and more efficient than a typical NC-SI Port Controller implemented with a microcontroller. Embodiments need not therefore rely on the BPFC 201 (used to handle regular network traffic), but instead may implement a separate instance of a BPFC-like parser.

In an embodiment, a first AM is adapted to implement a NC-SI Operational State Machine (OSM) in a way that is compatible with a conventional AMF. A second AM is adapted to implement the Instance ID (IID) parameter of the NC-SI specification in a simplified way as seen from the ruleset. A third AM is adapted to implement Channel Filters (CHF) for Receiving (Rx) and Transmitting (Tx) directions in a way that simplifies the design of the ruleset executing NC-SI commands which configure the filters.

Thus, an HEA 116 (shown in FIG. 1) may be adapted to implement a finite state machine to describe states related to an operation adhering to a standardized communication protocol, such as the NC-SI standard.

Figure 3:
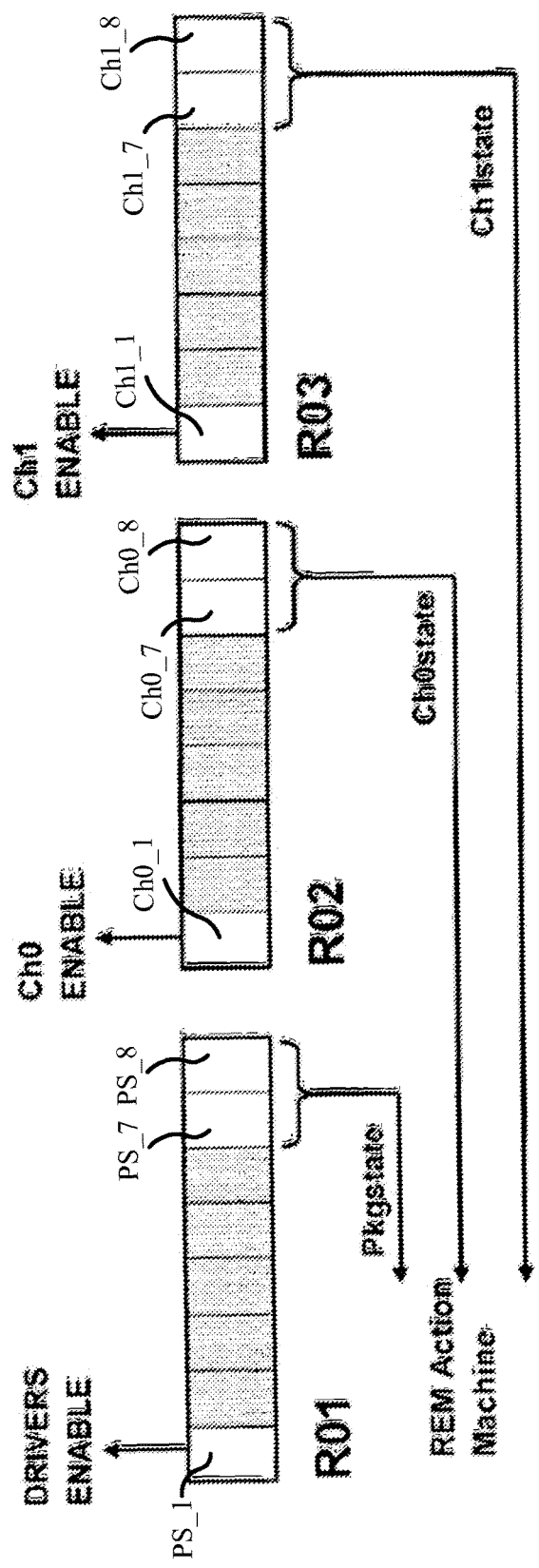
FIG. 3 depicts an operational state machine (OSM) in accordance with embodiments of the present disclosure.

Referring now to FIG. 3, an exemplary embodiment is adapted to implement three (3) state machines to describe the states related to: (i) whether and when the HEA 116 is ready to handle NC-SI command packets; (ii) when it is allowed to transmit packets through the NC-SI interface; and (iii) when it has entered a state where it is expecting configuration by the MC.

First R01 to third R03 byte-wide registers are employed in the HEA 116. Examples of these registers are depicted in FIG. 3 and, based on data provided from these registers, a finite state machine can make decisions regarding operations/actions to take, for example.

The first register R01 stores/holds package state (PS) data. A first, sticky bit PS_1 is used as an "enable" signal, whilst the seventh PS_7 and eighth PS_8 bits are used to indicate a PS. The use of two binary bits enables four possible package states to be indicated. For example, Table 1 below defines the four PSs and the respective values of the seventh and eighth bits in the first register R01.

TABLE 1

| Package State | Value of PS_7 & PS_8 | Status |
|---|---|---|
| PS0 | 00 | Deselected, Not Ready |
| PS1 | 01 | Deselected, Ready |
| PS2 | 10 | Selected, Not Ready |
| PS3 | 11 | Selected, Ready (Drivers Enabled) |

The second register R02 stores/holds Channel Zero (Ch0) state data. A first, sticky bit Ch0_1 of the second register R02 is used as an "enable" signal for Ch0, whilst the seventh Ch0_7 and eighth Ch0_8 bits are used to indicate a state of Ch0. As with the first register R01, the use of two binary bits enables four possible channel states to be indicated. For example, Table 2 below defines the four Ch0 states and the respective values of the seventh and eighth bits in the second register R02.

TABLE 2

| Channel 0 State | Value of Ch0_7 & Ch0_8 | Status |
|---|---|---|
| Ch0-S0 | 00 | Channel in Initial State |
| Ch0-S1 | 01 | Channel Disabled, Ready |
| Ch0-S2 | 10 | Channel Enabled, Not Ready |
| Ch0-S3 | 11 | Channel Enabled, Ready |

Similarly, the third register R03 stores/holds Channel One (Ch1) state data. A first, sticky bit Ch1_1 of the third register R03 is used as an "enable" signal for Ch1, whilst the seventh Ch1_7 and eighth Ch1_8 bits are used to indicate a state of Ch1. Again, the use of two binary bits enables four possible channel states to be indicated. For example, Table 3 below defines the four Ch1 states and the respective values of the seventh and eighth bits in the third register R03.

TABLE 3

| Channel 1 State | Value of Ch1_7 & Ch1_8 | Status |
|---|---|---|
| Ch1-S0 | 00 | Channel in Initial State |
| Ch1-S1 | 01 | Channel Disabled, Ready |
| Ch1-S2 | 10 | Channel Enabled, Not Ready |
| Ch1-S3 | 11 | Channel Enabled, Ready |

The values of the seventh and eighth bits of the first R01 to third R03 registers are therefore used to control the state machine(s) implemented by the HEA 116. For example, these bits may be provided to a first AM 208 (as shown in FIG. 2) of the HEA 166, the first AM 208 being specifically adapted to implement an NC-SI Operational State Machine (OSM).

It is noted that, in this embodiment, four package or channel states are defined although there are, in fact, more package or channel states defined in the NC-SI standard.

Figure 4:
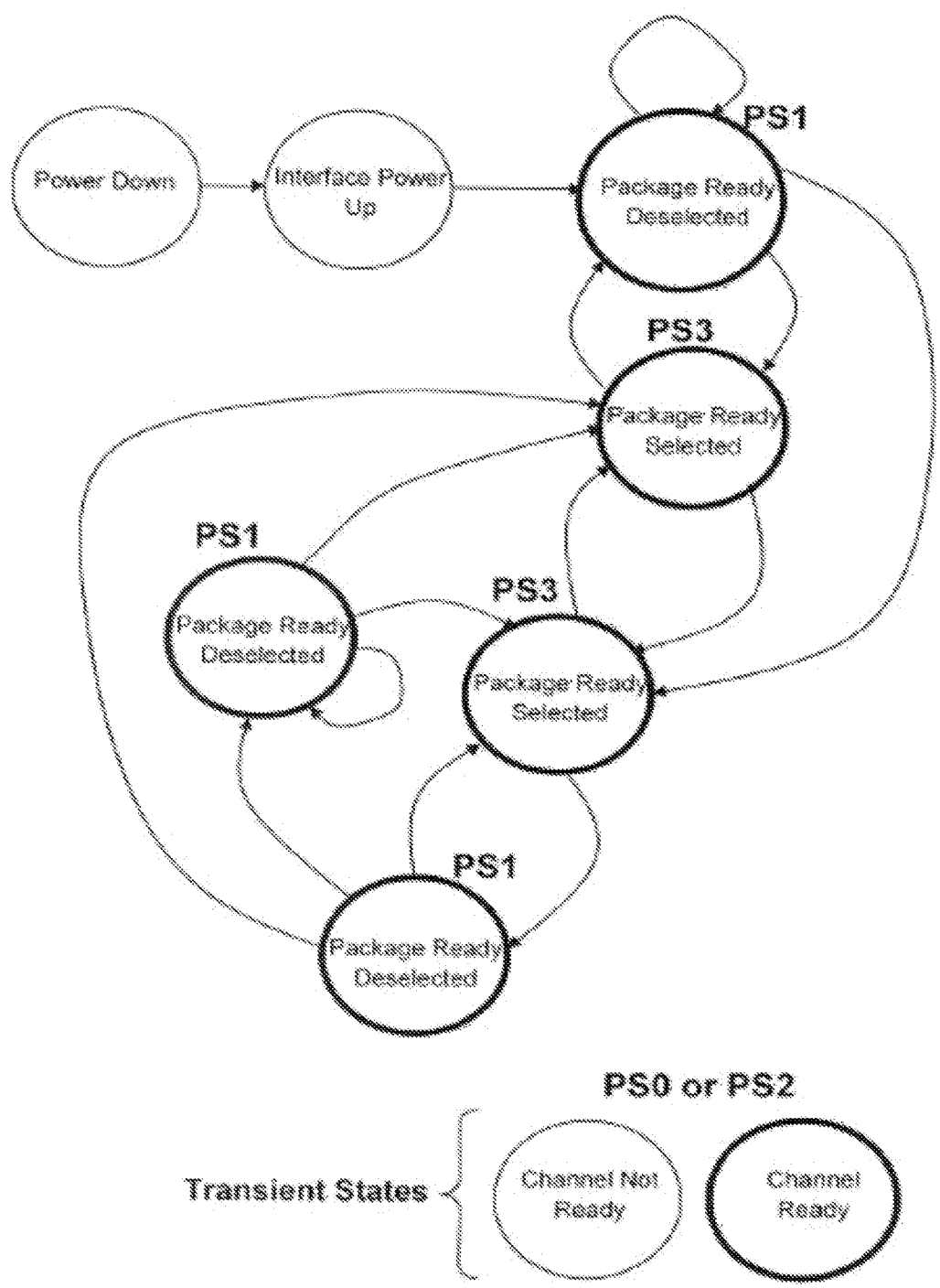
FIG. 4 shows a state diagram for the package operating states according to the NC-SI standard, in accordance with embodiments of the present disclosure.

By way of example, FIG. 4 shows a state diagram for a package operation according to the NC-SI standard. Table 4 below describes these states (relating to package operation) in more detail.

TABLE 4

| NC-SI State | NC-SI Description | Comments |
|---|---|---|
| Interface Power Down | The NC-SI interface is in the power down state | This state cannot be encoded since HEA is powered down |
| Interface Power Up | The NC-SI interface is in the power up state | This is a transient state. As such it is not encoded |
| **Package Selected (also referred to as the Selected State) | A selected package is allowed to turn on its electrical buffers and transmit through the NC-SI interface | This state is encoded by PS_7 = 1 |
| **Package DeSelected (also referred to as the DeSelected State) | A deselected package is not allowed to turn on its electrical buffers and transmit through the NC-SI interface | This state is encoded by PS_7 = 0 |
| Hardware Arbitration Enabled | When hardware arbitration is enabled, the package is allowed to transmit through the NC-SI interface only when it is selected and has the TOKEN op-code | Hardware arbitration is not supported and therefore not encoded |
| Hardware Arbitration Disabled | When hardware arbitration is disabled, the package is allowed to transmit through the NC-SI interface anytime it is selected, regardless of whether it has the TOKEN op-code | Hardware arbitration is not supported and therefore not encoded |
| **Package Ready | In the Package Ready state, the package is able to accept and respond to NC-SI commands for the package and be Selected | This state is encoded by PS_8 = 1 |

TABLE 4-continued

| NC-SI State | NC-SI Description | Comments |
| --- | --- | --- |
| **Package Not Ready | The Package Not Ready state is a transient state in which the package does not accept package-specific commands | This state is encoded by PS_8 = 0 |

It is proposed to only encode the states marked with "**." These four encoded package states PS0 to PS3 are identified as bold circles in the state diagram of FIG. 4. In other words, embodiments are adapted to implement a finite state machine having fewer possible states than those defined by the NC-SI standard.

Figure 5:
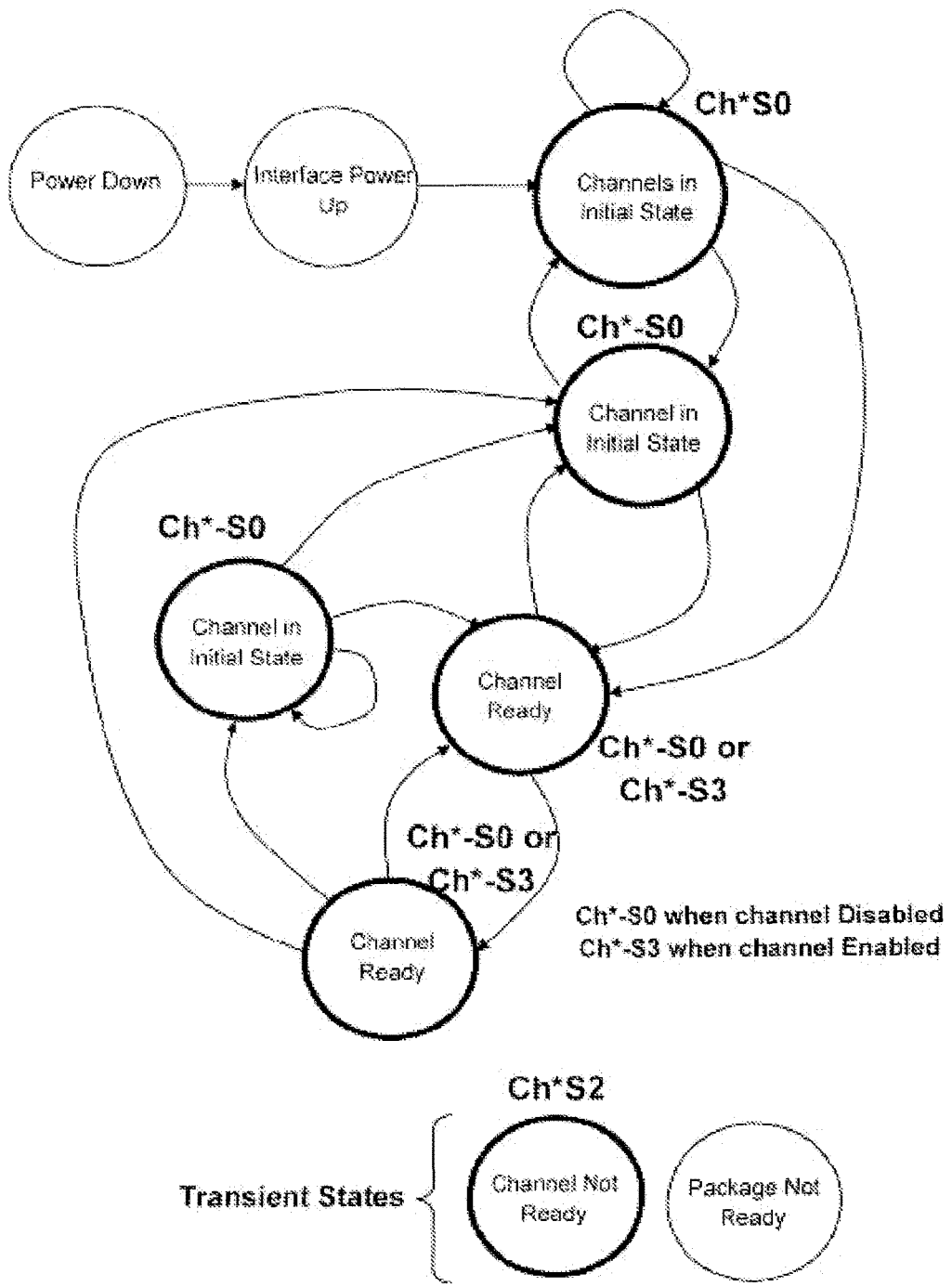
FIG. 5 shows a state diagram for an OSM according to the NC-SI standard, in accordance with embodiments of the present disclosure.

Further, FIG. 5 shows a state diagram for a channel operation of an Operational State Machine (OSM) according to the NC-SI standard. Table 5 below describes the states (relating to the channel operation) in more detail.

TABLE 5

| NC-SI State | NC-SI Description | Comments |
| --- | --- | --- |
| **Channel Ready | In the Channel Ready state, a channel within the package is able to accept channel-specific NC-SI commands that are addressed to its Channel ID (Package ID + Internal Channel ID) | This state is encoded by Ch#_8 = 1, where # is the channel number (e.g. 0 or 1) |
| Channel Not Ready | The Channel Not Ready state is a transient state in which the channel does not accept channel-specific commands. | This is a transient state. As such, it is not encoded. Furthermore, there is no reason why a channel would not accept a specific command. |
| **Initial State | In the Initial State, the channel is able to accept and respond to NC-SI commands, and one or more configuration settings for the channel need to be set or restored by the MC (that is, the channel has not yet been initialized, or has encountered a condition where one or more settings have been lost and shall be restored) | This state is encoded by Ch#_8 = 0, where # is the channel number (e.g. 0 or 1) |
| **Channel Enabled | This is a sub-state of the Channel Ready state. When a channel is enabled, the channel is allowed to transmit unrequested packets (that is, packets that are not command responses - for example, AEN and Pass-through packets) through the NC-SI | This state is encoded by Ch#_7 = 1, where # is the channel number (e.g. 0 or 1) |
| **Channel Disabled | This is a sub-state of the Channel Ready state. When a channel is disabled, the channel is not allowed to transmit unrequested packets (that is, packets that are not command responses - for example, AEN and Pass-through packets) through the NC-SI | This state is encoded by Ch#_7 = 0, where # is the channel number (e.g. 0 or 1) |

It is proposed to only encode the states marked with "**". These four encoded states Ch*-S0 to Ch*-S3 are identified as bold circles in the state diagram of FIG. 5. Thus, although the NC-SI standard defines five states for the channel operation, the described embodiment implements a finite state machine having only four possible channel states.

Thus, by way of example, embodiments may be employed in the implementation of a standardized interface using reduced logic area and power dissipation. Unlike conventional approaches, which rely on the use of an embedded microcontroller, embodiments may use a programmable architecture which provides for improved flexibility and reduced area and/or power consumption.

Embodiments may implement a state machine which makes operating and/or processing decisions depending on data read from one or more registers of a host Ethernet adapter (HEA) of a network processor.

Thus, an embodiment may comprise a parser for a network processor, wherein the parser employs a finite state machine (FSM) that only implements a reduced set of states for an operation compared to those defined for the operation in a standard communication protocol or standard. By way of example, where the NC-SI specification describes eight (8) states related to a package operation, an embodiment may employ a state machine that only implements four (4) of the eight states.

As mentioned above with reference to FIG. 2, a second AM may be implemented in the HEA 116 which is adapted to implement the Expected Instance ID (IID) parameter of the NC-SI specification. This may be implemented in a manner which simplifies the ruleset by making the HEA structure more aligned to the definition of the NC-SI protocol in a simplified way as seen from the ruleset.

IID is used by the parser 207 to detect retried commands. The parser 207 compares IID found in a current packet to the last IID received. If they are different, then the received packet is determined to be a new command (and not a retried command). Such a comparison process may be skipped/avoided if no previous IID has been received.

Such an IID action machine (AM) may be implemented by reserving two registers in the HEA. However, implementing a dedicated IID AM simplifies the ruleset by aligning the structure of the HEA with the NC-SI standard.

It has also been mentioned above with reference to FIG. 2, that a third AM may be implemented in the HEA 116 which is adapted to implement Channel Filters (CHF) (for receiving and transmitting directions). This may be done in a manner that simplifies the design of a ruleset executing NC-SI commands for configuring the filters.

Figure 6:
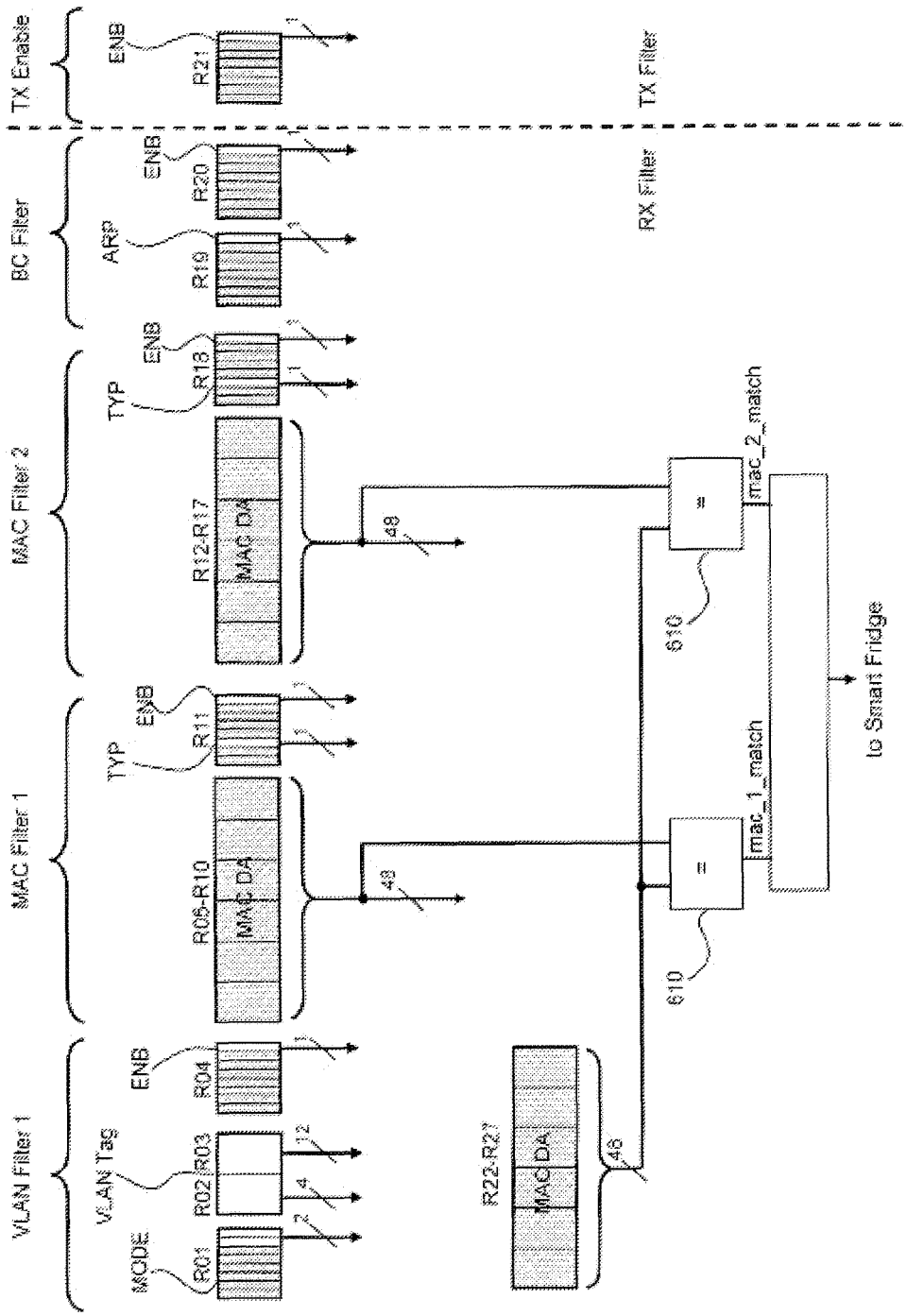
FIG. 6 depicts a channel filters (CHF) action machine, in accordance with embodiments of the present disclosure.

By way of example, FIG. 6 depicts a CHF action machine according to an embodiment. The action machine comprises a plurality of registers which are adapted to be filled by a parser when decoding filter command. The outputs of the registers are forward to the RBB unit of each port where filter logic determines if the packet is forwarded to VLIM or to NIM.

The CHF Action Machine depicted in FIG. 6 is a way for the BPFC in the network controller to control the extraction and injection of NC-SI Packets. There is one CHF Action machine per Ethernet Port.

The registers used are in the "RX Filter" side. Packets received on the Ethernet Port are extracted if they match the VLAN Tag (R02-R03) or one of the 2 MAC Addresses (R05-R10 or R12-R17). Each criteria is enabled by specific bits (R04 for VLAN, R11 and R18 for MACs). MACs are also enabled for Unicast or Multicast (R11 and R18).

Additional filtering option is with ARP packets (R19) and Broadcast (R20).

The MAC DA of the received Ethernet packet (R22-R27) is compared on-the-fly by specific comparison hardware 610 and the result is saved in a working register of the network controller (in the so-called "Smart Fridge" Action Machine).

This result is subsequently analyzed by the network controller rules which also compare the VLAN Tag and use the other control bits.

A hardware switch (not shown) is then set to extract the incoming packet.

The register used is in the "TX Filter" side. Only one Enable bit (R21) is used. It is set by the network controller rules when decoding received "Enable Channel Network TX" commands.

This is simply a way for the parser to "remember" if the Ethernet port is enabled for injection of NC-SI Packets.

The injection is controlled by the network controller rules analyzing each received packet.

If the MAC DA (R22-27) matches one of the MAC Addresses in R05-R10 or R12-R17 and R21 has its Enable bit set, then the packet is steered by hardware logic (not shown) to the Ethernet port, instead of being consumed by the NPC itself.

Figure 7:
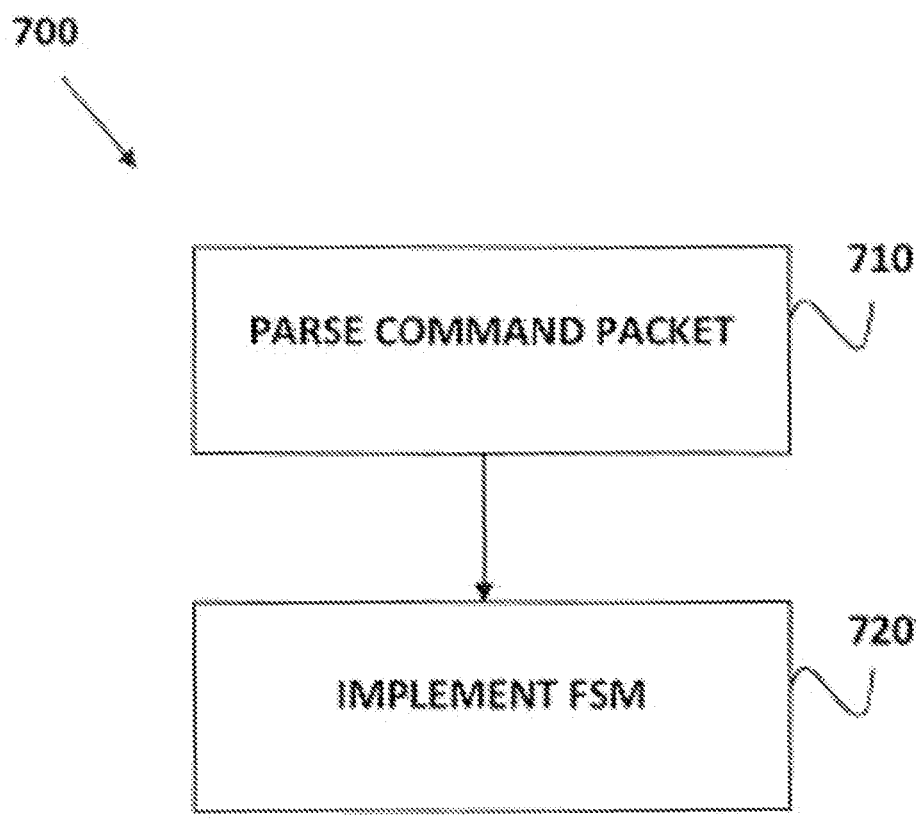
FIG. 7 depicts a flow diagram of a method of operating a host network controller, in accordance with embodiments of the present disclosure.

Referring now to FIG. 7, there is depicted a flow diagram of a method 700 of operating a host network controller for a network processor according to an embodiment. The method starts when a command packet is received at the network processor having the host network controller. In step 710, the command packet is received, parsed, and analyzed by the parser.

Next, in step 720, the host network controller implements a finite state machine adhering to a standardized communication protocol, wherein the finite state machine has fewer possible states than those defined for the operation in accordance with the standardized communication protocol. Here, the host network controller uses at least one action machine to implement one or more functions adhering to the standardized communication protocol. To do so, the parser provides data to the action machine(s) from, or based on, the command packet.

Figure 8:
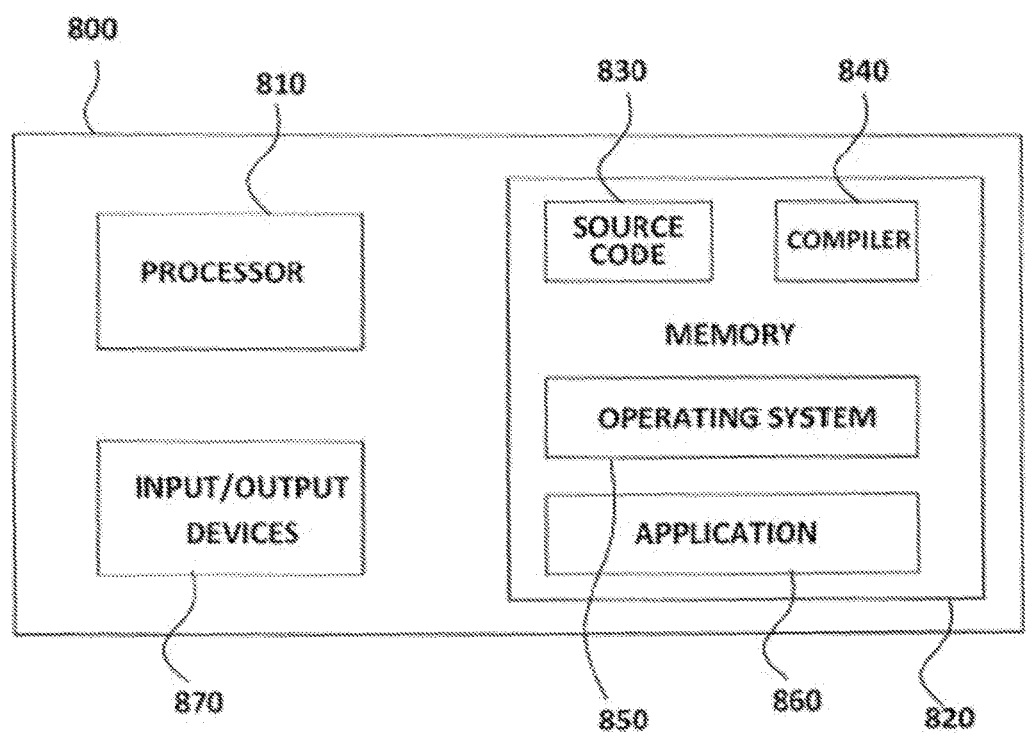
FIG. 8 illustrates an example of a computer in which illustrative embodiments of the present disclosure may be employed.

FIG. 8 illustrates an example of a computer 800 in which an action machine may be employed. Various operations discussed above may utilize the capabilities of the computer 800. An action machine may be incorporated in any element, module, application, and/or component discussed herein, such as input and/or output (I/O) devices 870.

The computer 800 includes, but is not limited to, PCs, workstations, laptops, PDAs, palm devices, servers, storages, and the like. Generally, in terms of hardware architecture, the computer 800 may include one or more processors 810, memory 820, and one or more I/O devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer 800, and the processor 810 may be a semiconductor based microprocessor (in the form of a microchip) or a microprocessor.

The memory 820 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. Furthermore, the application 860 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device, or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description has been presented for purposes of illustration and description, and is not intended to be exhaustive or limited to the invention in the form disclosed. Many modifications and variations will be apparent to those of ordinary skill in the art. Embodiments have been chosen and described in order to best explain principles of proposed embodiments, practical application(s), and to enable others of ordinary skill in the art to understand various embodiments with various modifications are contemplated.

What is claimed is:

1. A method of operating a host network controller for a network processor, wherein the host network controller comprises at least one register, and wherein the method comprises:
    controlling a packet parser in the host network controller;
    parsing a data packet using the packet parser;
    providing data to the at least one register based on a result of parsing the data packet, wherein the data packet is parsed by selecting one or more channels in the at least one register;
    storing, in the at least one register, a restricted set of state data indicative of fewer possible states than those defined for an operation in accordance with a standardized communication protocol; and
    causing the host network controller to implement a finite state machine for the operation adhering to the standardized communication protocol based on the restricted set of state data stored in the at least one register such that the finite state machine has fewer possible states than those defined for the operation in accordance with the standardized communication protocol.

2. The method of claim 1, wherein the host network controller comprises at least one action machine, and wherein the causing further comprises:
    controlling the at least one action machine to implement one or more functions adhering to the standardized communication protocol based on the restricted set of state data stored in the at least one register.

3. The method of claim 2, wherein the controlling the at least one action machine comprises:
    causing a first action machine to implement an operational state machine adhering to the standardized communication protocol.

4. The method of claim 2, wherein the controlling the at least one action machine comprises:
    causing a second action machine adapted with a host Ethernet adapter to implement an instance identification parameter in accordance with the standardized communication protocol, the implementation of the instance identification parameter aligning the structure of the host Ethernet adapter with the standardized communication protocol.

5. The method of claim 2, wherein the step of controlling the at least one action machine comprises:
    causing a third action machine to implement at least one channel filter, the at least one channel filter being configurable by execution of a command adhering to the standardized communication protocol.

6. The method of claim 1, wherein the storing a restricted set of state data comprises:
    determining the operation;
    determining a set of state data for the operation, the set of state data including two or more states, the two or more states being defined for the operation in accordance with the standardized communication protocol;
    determining that a particular state of the two or more states is not supported by the host network controller; and
    storing, in the at least one register, the restricted set of state data, wherein the restricted set of state data does not include data relating to the particular state.

7. The method of claim 1, wherein the storing a restricted set of state data comprises:
    determining the operation;
    determining a set of state data for the operation, the set of state data including two or more states, the two or more states being defined for the operation in accordance with the standardized communication protocol;
    determining that a particular state of the two or more states is a transient state; and
    storing, in the at least one register, the restricted set of state data, wherein the restricted set of state data does not include data relating to the particular state.

8. A computer program product for operating a host network controller, wherein the computer program product comprises a computer-readable storage medium having computer-readable program code embodied therewith, the computer-readable program code configured to perform the method of:

controlling a packet parser in a host network controller;
parsing a data packet using the packet parser;
providing data to at least one register based on a result of parsing the data packet, wherein the data packet is parsed by selecting one or more channels in the at least one register;
storing, in the at least one register on the host network controller, a restricted set of state data indicative of fewer possible states than those defined for an operation in accordance with a standardized communication protocol; and
causing the host network controller to implement a finite state machine for the operation adhering to the standardized communication protocol based on the restricted set of state data stored in the at least one register such that the finite state machine has fewer possible states than those defined for the operation in accordance with the standardized communication protocol.

9. The computer program product of claim 8, wherein the host network controller includes and at least one action machine, and wherein the causing further comprises:
controlling the at least one action machine to implement one or more functions adhering to the standardized communication protocol based on the restricted set of state data stored in the at least one register.

10. The computer program product of claim 9, wherein the controlling the at least one action machine comprises:
causing a first action machine to implement an operational state machine adhering to the standardized communication protocol.

11. The computer program product of claim 9, wherein the controlling the at least one action machine comprises:
causing a second action machine adapted with a host Ethernet adapter to implement an instance identification parameter in accordance with the standardized communication protocol, the implementation of the instance identification parameter aligning the structure of the host Ethernet adapter with the standardized communication protocol.

12. The computer program product of claim 9, wherein the controlling the at least one action machine comprises:
causing a third action machine to implement at least one channel filter, the at least one channel filter being configurable by execution of a command adhering to the standardized communication protocol.

13. The computer program product of claim 8, wherein the storing a restricted set of state data comprises:
determining the operation;
determining a set of state data for the operation, the set of state data including two or more states, the two or more states being defined for the operation in accordance with the standardized communication protocol;
determining that a particular state of the two or more states is not supported by the host network controller; and
storing, in the at least one register, the restricted set of state data, wherein the restricted set of state data does not include data relating to the particular state.

14. The computer program product of claim 8, wherein the storing a restricted set of state data comprises:
determining the operation;
determining a set of state data for the operation, the set of state data including two or more states, the two or more states being defined for the operation in accordance with the standardized communication protocol;
determining that a particular state of the two or more states is a transient state; and
storing, in the at least one register, the restricted set of state data, wherein the restricted set of state data does not include data relating to the particular state.

15. A system for operating a host network controller comprising:
a memory;
a network processor having a host network controller, wherein the host network controller comprises at least one register; and
a processor circuit in communication with the memory and the network processor, wherein the processor circuit is configured to perform a method comprising:
controlling a packet parser in the host network controller;
parsing a data packet using the packet parser;
providing data to the at least one register based on a result of parsing the data packet, wherein the data packet is parsed by selecting one or more channels in the at least one register;
storing, in the at least one register, a restricted set of state data indicative of fewer possible states than those defined for an operation in accordance with a standardized communication protocol; and
causing the host network controller to implement a finite state machine for the operation adhering to the standardized communication protocol based on the restricted set of state data stored in the at least one register such that the finite state machine has fewer possible states than those defined for the operation in accordance with the standardized communication protocol.

16. The system of claim 15, wherein the host network controller further comprises at least one action machine, and wherein the causing further comprises:
controlling the at least one action machine to implement one or more functions adhering to the standardized communication protocol based on the restricted set of state data stored in the at least one register.

17. The system of claim 16, wherein the controlling the at least one action machine comprises:
causing a first action machine to implement an operational state machine adhering to the standardized communication protocol.

18. The system of claim 16, wherein the controlling the at least one action machine comprises:
causing a second action machine adapted with a host Ethernet adapter to implement an instance identification parameter in accordance with the standardized communication protocol, the implementation of the instance identification parameter aligning the structure of the host Ethernet adapter with the standardized communication protocol.

19. The system of claim 16, wherein the step of controlling the at least one action machine comprises:
causing a third action machine to implement at least one channel filter, the at least one channel filter being configurable by execution of a command adhering to the standardized communication protocol.

20. The system of claim 15, wherein the storing a restricted set of state data comprises:
determining the operation;
determining a set of state data for the operation, the set of state data including two or more states, the two or more states being defined for the operation in accordance with the standardized communication protocol;

determining that a particular state of the two or more states is a state where the host network controller is powered down; and storing, in the at least one register, the restricted set of state data, wherein the restricted set of state data does not include data relating to the particular state.

* * * * *